United States Patent
Inoue

(10) Patent No.: US 9,753,360 B2
(45) Date of Patent: Sep. 5, 2017

(54) HEAT DISSIPATING DEVICE HAVING INCREASED HEAT DISSIPATING CAPACITY, LIGHT SOURCE UNIT INCLUDING SAME HEAT DISSIPATING DEVICE AND PROJECTOR INCLUDING SAME LIGHT SOURCE UNIT

(71) Applicant: CASIO COMPUTER CO., LTD., Shibuya-ku, Tokyo (JP)

(72) Inventor: Kiyohiko Inoue, Sagamihara (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/005,447

(22) Filed: Jan. 25, 2016

(65) Prior Publication Data

US 2016/0273753 A1    Sep. 22, 2016

(30) Foreign Application Priority Data

Mar. 20, 2015   (JP) .................................. 2015-057846

(51) Int. Cl.
  *G03B 21/16*   (2006.01)
  *G03B 21/20*   (2006.01)
(52) U.S. Cl.
  CPC ......... *G03B 21/16* (2013.01); *G03B 21/2033* (2013.01)
(58) Field of Classification Search
  CPC .... G03B 21/16; G03B 21/18; G03B 21/2033; H04N 9/3141; H04N 9/3144; H04N 9/3161; F21V 29/74; F21V 29/77; F21V 29/763; F21V 29/773
  See application file for complete search history.

(56) References Cited

U.S. PATENT DOCUMENTS

| 7,866,827 B2 | 1/2011 | Egawa et al. | |
| 2004/0090602 A1* | 5/2004 | Imade ................ | G02B 27/0933 353/102 |
| 2009/0135613 A1* | 5/2009 | Peng ....................... | F21K 9/233 362/373 |
| 2009/0141247 A1* | 6/2009 | Oh ......................... | G03B 21/16 353/61 |

(Continued)

FOREIGN PATENT DOCUMENTS

| JP | 2007148341 A | 6/2007 |
| JP | 2008181776 A | 8/2008 |

(Continued)

OTHER PUBLICATIONS

Japanese Office Action (and English translation thereof) dated Feb. 16, 2017, issued in counterpart Japanese Application No. 2015-057846.

*Primary Examiner* — Sultan Chowdhury
(74) *Attorney, Agent, or Firm* — Holtz, Holtz & Volek PC

(57) ABSTRACT

To provide a heat dissipating device which enables the fabrication of a small and highly bright light source unit and a light source unit and a projector which include this heat dissipating device, a heat dissipating device is provided which includes a fixing portion which fixes a first light source, a first heat dissipating portion having a plurality of fins provided on a rear surface side of the fixing portion, a flat plate portion erected from the fixing portion and a second heat dissipating portion having a plurality of fins provided on the flat plate portion.

13 Claims, 9 Drawing Sheets

(56) References Cited

U.S. PATENT DOCUMENTS

| | | | |
|---|---|---|---|
| 2009/0153805 A1* | 6/2009 | Li | G03B 21/16 353/57 |
| 2014/0240679 A1* | 8/2014 | Nishimori | G03B 21/2013 353/52 |
| 2014/0307232 A1 | 10/2014 | Sato et al. | |
| 2015/0156466 A1* | 6/2015 | Nagatsu | G03B 21/16 353/54 |
| 2015/0226417 A1* | 8/2015 | Hirose | F21V 29/51 353/54 |

FOREIGN PATENT DOCUMENTS

| | | |
|---|---|---|
| JP | 2009181098 A | 8/2009 |
| JP | 2011040510 A | 2/2011 |
| JP | 2013196946 A | 9/2013 |
| JP | 2014105136 A | 6/2014 |
| JP | 2014164152 A | 9/2014 |
| JP | 2014206581 A | 10/2014 |

\* cited by examiner

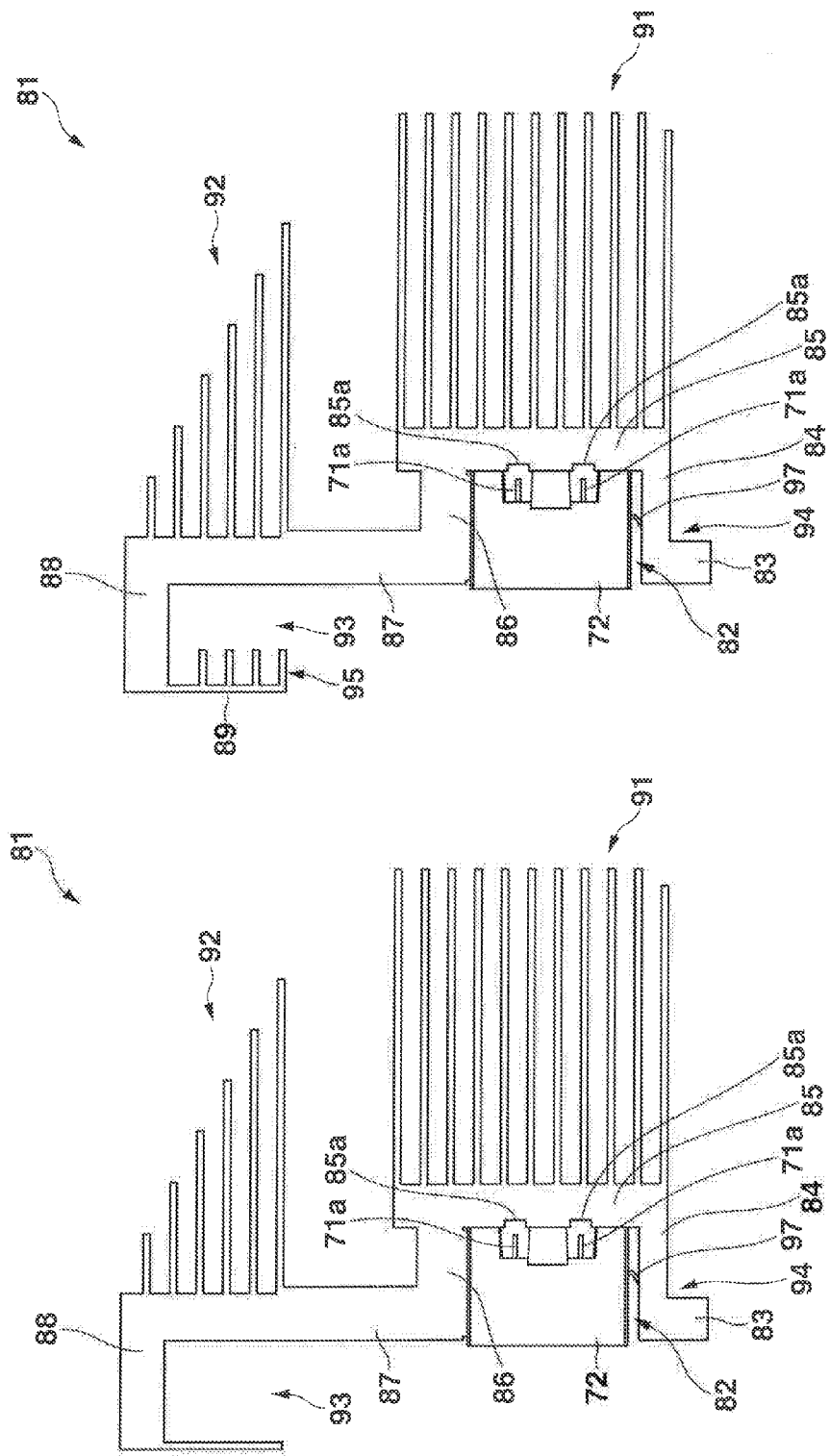

HEAT DISSIPATING DEVICE HAVING INCREASED HEAT DISSIPATING CAPACITY, LIGHT SOURCE UNIT INCLUDING SAME HEAT DISSIPATING DEVICE AND PROJECTOR INCLUDING SAME LIGHT SOURCE UNIT

CROSS-REFERENCE TO RELATED APPLICATION

This application is based upon and claims the benefit of priority under 35 U.S.C. 119 of Japanese Patent Application No. 2015-57846 filed on Mar. 20, 2015, the entire disclosure of which, including the description, claims, drawings and abstract, is incorporated herein by reference.

BACKGROUND OF THE INVENTION

Field of the Invention

The present invention relates to a heat dissipating device having an increased heat dissipating capacity, a light source unit including this heat dissipating device, and a projector including this light source unit.

Description of the Related Art

In these days, data projectors are used on many occasions as an image projection system which projects an image of a screen of a personal computer and a video image, as well as images based on image data which is stored on a memory card or the like on to a screen. In these data projectors, light emitted from a light source is collected to a micromirror display device called a DMD (Digital micromirror Device) or a liquid crystal panel for displaying a color image on to the screen.

Some of those projectors employ semiconductor light emitting elements such as laser diodes or LEDs as a light source. For example, a projector disclosed in Japanese Unexamined Patent Publication No. 2013-196946 includes an excitation light shining device including a plurality of semiconductor light emitting elements and a luminescent plate device on which excitation light is shone from the excitation light shining device to thereby emit luminous light. Then, a heat sink as a heat dissipating device for cooling the plurality of semiconductor light emitting elements of the excitation light shining device is provided on a rear surface of a holder which holds the plurality of semiconductor light emitting elements.

Additionally, Japanese Unexamined Patent Publication No. 2014-206581 discloses a projector which includes an excitation light source including laser diodes or the like and a luminescent plate. In this projector, a heat sink as a heat dissipating device is provided on a rear surface side of the excitation light source to cool the excitation light source, and a cooling fan is also provided to cool the heat sink. In this projector, the output of excitation light from the excitation light source is controlled according to the luminance level of a picture signal, and the output of cooling air from the cooling fan is also controlled.

The heat dissipating device such as a heat sink is provided for the light source which includes the plurality of semiconductor light emitting elements, as described above. This heat dissipating device can improve the heat dissipating efficiency by controlling the light source and the cooling fan. However, there exists an upper limit for the heat dissipating capacity. On the other hand, in these days, small and highly bright semiconductor light emitting elements are developed. Then, in a light source employing the plurality of such a small and highly bright semiconductor light emitting element, the heat generation density becomes high, and this makes it difficult for the semiconductor light emitting elements to be cooled, thereby making it difficult to realize a reduction in size of the light source, which would otherwise become possible by increasing the density of layout of the semiconductor light emitting elements. Then, the semiconductor light emitting elements and the holder which holds them cannot be formed small, thereby making it difficult to reduce the size of the projector.

SUMMARY OF THE INVENTION

An object of the invention is to provide a heat dissipating device which enables a small and highly bright light source to be fabricated, a light source unit including this heat dissipating device, and a projector including this light source unit.

According to an aspect of the invention, there is provided a heat dissipating device having a fixing portion which fixes a first light source, a first heat dissipating portion having a plurality of fins which is provided on a rear surface side of the fixing portion, a flat plate portion which is erected from the fixing portion and a second heat dissipating portion having a plurality of fins which is provided on the flat plate portion.

According to another aspect of the invention, there is provided a light source unit having the first light source including the heat dissipating device of the invention having a holder which holds a plurality of semiconductor light emitting elements.

According to a further aspect of the invention, there is provided a projector including the light source unit of the invention, a light source side optical system configured to guide light from the light source unit to a display device, a projection side optical system configured to project an image emitted from the display device on to a screen, and a projector control unit configured to control the light source unit and the display device.

BRIEF DESCRIPTION OF SEVERAL VIEWS OF DRAWINGS

FIG. 6A is a side view of a first modified example of the heat sink according to the first embodiment of the invention.

FIG. 6B is a side view of a second modified example of the heat sink according to the first embodiment of the invention.

DETAILED DESCRIPTION OF THE PREFERRED EMBODIMENT

Figure 1:
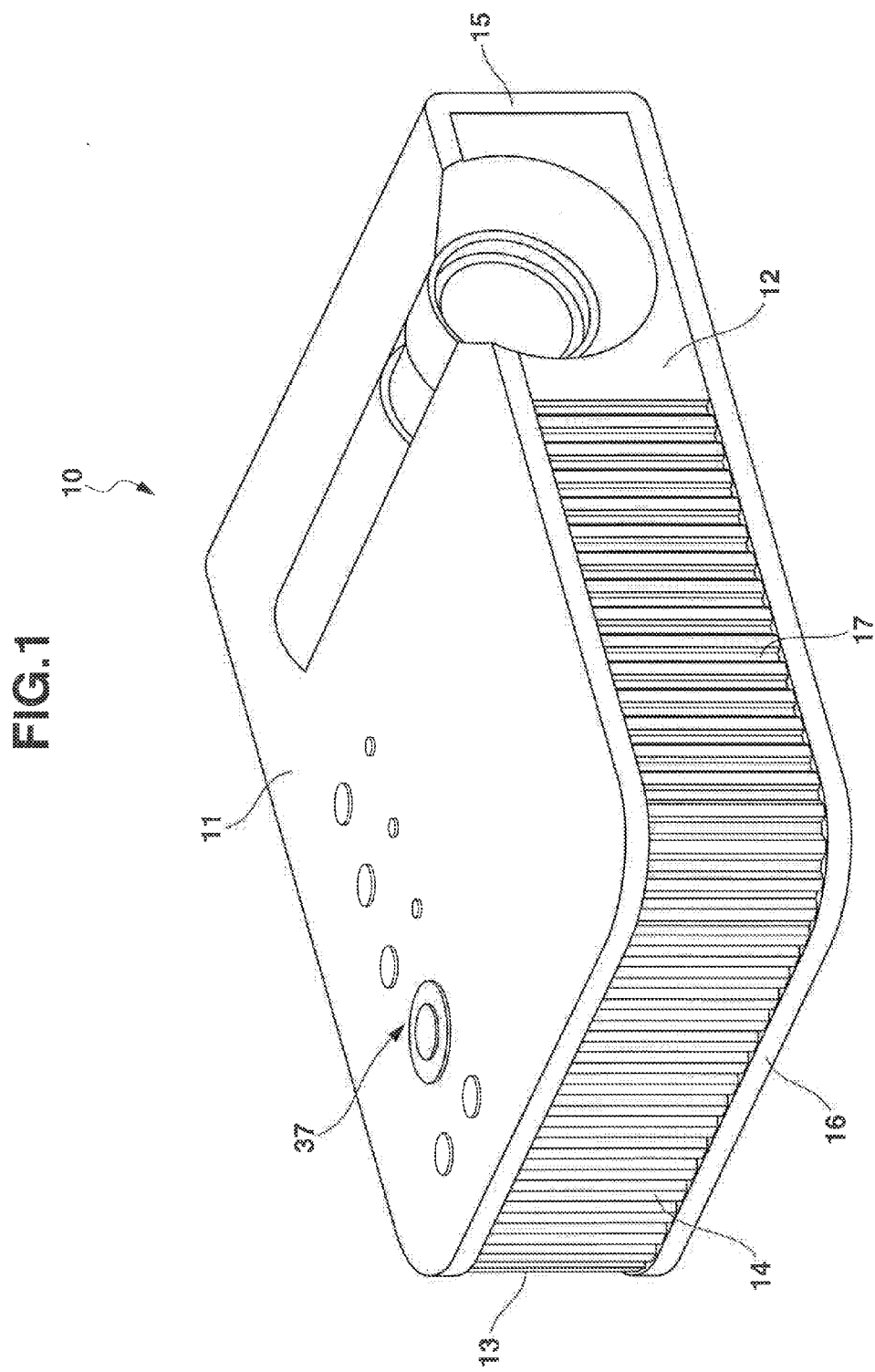
FIG. 1 is a perspective view showing an external appearance of a projector according to a first embodiment of the invention.

Hereinafter, a first embodiment of the invention will be described based on the accompanying drawings. FIG. 1 is an external perspective view of a projector 10. When referred to in relation to the projector 10 in this embodiment, left and right denote, respectively, left and right with respect to a projecting direction, and front and rear denote, respectively, front and rear with respect to a direction towards a screen from the projector 10 and a traveling direction of a pencil of light emitted from the projector 10.

The projector 10 has, as shown in FIG. 1, a casing having a substantially rectangular parallelepiped shape. The casing is made up of a front panel 12, a back panel 13, side panels of a right side panel 14 and a left side panel 15, an upper panel 11, and a lower panel 16. The projector 10 has a projection port provided to a left side of the front panel 12. Further, a plurality of inside air outlet ports 17 are provided in the front panel 12. Then, although not shown, the projector 10 includes an Ir reception unit which receives a control signal from a remote controller.

Additionally, a keys/indicators unit 37 is provided on the upper panel 11. Disposed on this keys/indicators unit 37 are keys and indicators which include a power indicator, a projection switch key, and an overheat indicator. The power indicator informs whether a power supply switch key or a power supply is on or off. The projection switch key switches on and off the projection by the projector 10. The overheat indicator informs of an overheat condition occurring in a light source unit, a display device, a control circuit or the like when they really overheat.

Further, although not shown, an input-output connector unit where a USB terminal, an image signal input D-SUB terminal where analog RGB image signals are inputted, an S terminal, an RCA terminal, a voice or sound output terminal and the like are provided and various terminals which include a power supply adaptor plug and the like are provided on the back panel 13. In addition, a plurality of outside air inlet ports are formed in the back panel 13.

Figure 2:
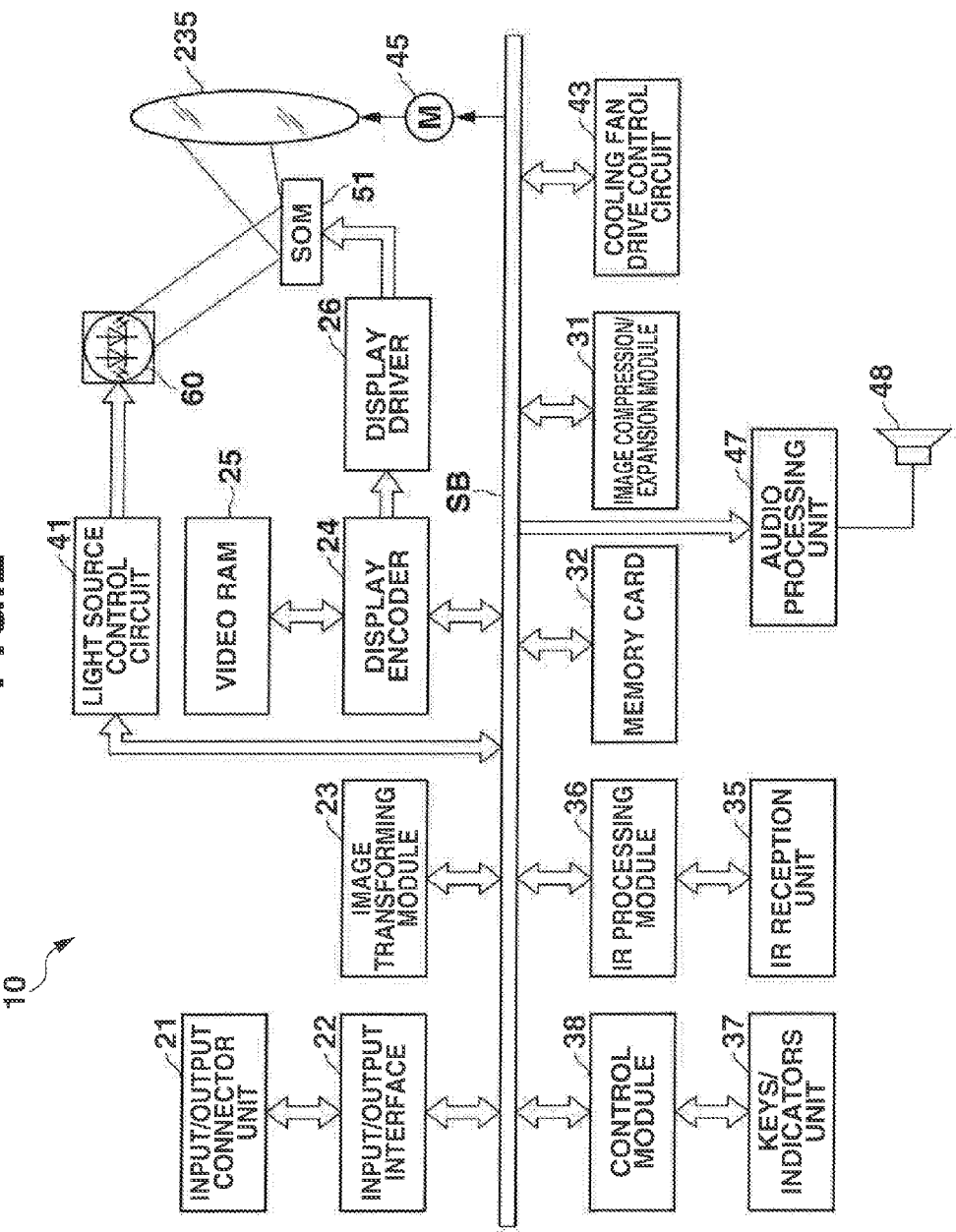
FIG. 2 is a block diagram showing functional blocks of the projector according to the first embodiment of the invention.

Next, a projector control unit of the projector 10 will be described by the use of a functional block diagram shown in FIG. 2. The projector control unit includes a control module 38, an input-output interface 22, an image transforming module 23, a display encoder 24, a display driver 26 and the like.

This control module 38 governs the control of operations of circuitries within the projector 10 and is made up of a CPU, a ROM which stores in a fixed fashion operation programs of various types of settings, a RAM which is used as a working memory, and the like.

Image signals of various standards that are inputted from the input-output connector unit 21 are sent via the input-output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control module and drives a display device 51, which is a spatial optical modulator (SOM), at an appropriate frame rate which corresponds to an output of the image signal from the display encoder 24. Then, in this projector 10, a pencil of light that is emitted from a light source unit 60 is shone onto the display device 51 via a light source side optical system, whereby an optical image (image light) is formed by using reflected light reflected by the display device 51. The image so formed is then projected on to a screen, not shown, for display thereon via a projection side optical system. A movable lens group 235 of the projection side optical system is driven by a lens motor 45 for zooming or focusing.

An image compression-expansion module 31 performs a recording process of data compressing a brightness signal and a color difference signal of the image signal to be sequentially written on a memory card 32 that is a detachable recording medium through operations using ADCT and the Huffman method.

Further, when in a reproducing mode, the image compression-expansion module 31 reads out the image data recorded on the memory card 32 and expands individual image data which make up a series of dynamic images frame by frame. Then, the image compression-expansion module 31 outputs the image data to the display encoder 24 via the image transforming module 23 so as to enable the display of dynamic images based on the image data stored on the memory card 32.

Operation signals generated at the keys/indicators unit 37 which includes the main keys and the indicators which are provided on the upper panel 11 of the casing are sent out directly to the control module 38. Key operation signals from the remote controller are received by the Ir reception unit 35, and code signals are demodulated by an Ir processing module 36 to be outputted to the control module 38.

An audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a loudspeaker 48 to output loudly sound or voice based on the audio data.

The control module 38 controls a light source control circuit 41 which is configured as a light source control unit. This light source control circuit 41 controls separately and individually the emission of light in the red wavelength range, light in the green wavelength range and light in the blue wavelength range from the light source unit 60 so that predetermined wavelength ranges of light required when an image is generated can be emitted from the light source unit 60.

The control module 38 causes a cooling fan drive control circuit 43 to detect temperatures through a plurality of temperature sensors which are provided in the light source unit 60 so as to control the rotating speeds of cooling fans based on the results of the temperature detections. The control module 38 also controls the cooling fan drive control circuit 43 so that the cooling fans continue to rotate even after the power supply to a projector main body is turned off through a timer or the power supply to the projector main body is turned off depending upon the results of the temperature detections by the temperature sensors.

Figure 3:
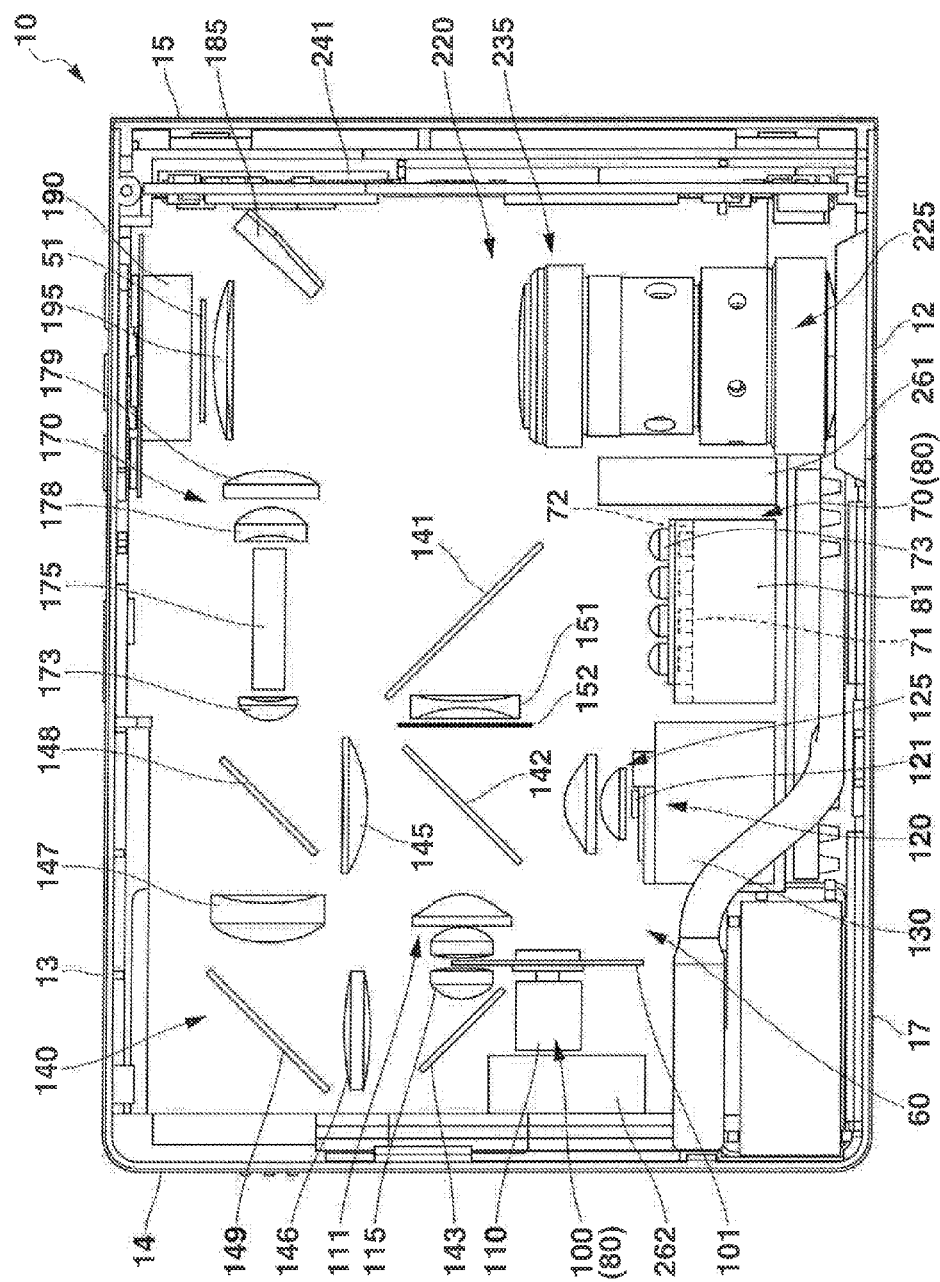
FIG. 3 is a schematic plan view showing an internal construction of the projector according to the first embodiment of the invention.

Next, an internal construction of the projector 10 will be described based on FIG. 3. FIG. 3 is a schematic plan view showing the internal construction of the projector 10. The projector 10 includes a control circuit board 241 which is provided near the left side panel 15. The control circuit board 241 includes a power supply circuit block and a light source control block. The projector 10 includes the light source unit 60 which is provided at a front and slightly rightward portion in the casing of the projector 10. The projector 10 includes alight source side optical system 170 which is disposed between the light source unit 60 and the back panel 13. The projector 10 includes a projection side optical system 220 which is disposed on aside of the casing which faces the left side panel 15.

The light source unit 60 includes a first light source which is a light source of light in the blue wavelength range and also includes an excitation light shining device 70 which also function as an excitation light source, a red light source device 120 which is a second light source and which functions as a light source of light in the red wavelength range, and a green light source device 80 which is a third light source and which functions as a light source of light in the green wavelength range. The green light source device 80 is made up of the excitation light shining device 70 and a luminescent plate device 100. Then, a light guiding optical system 140 is disposed in the light source unit 60, and this light guiding optical system 140 guides and emits light in the red, green and blue wavelength ranges. The light guiding optical system 140 collects light in the red, green and blue wavelength ranges emitted from the respective light sources to an entrance port of a light tunnel 175.

The excitation light shining device 70 is disposed at a front and substantially central portion lying near the front panel 12 in the casing of the projector 10. The excitation light shining device 70 includes a block-shaped holder 72 and a heat sink 81. The holder 72 holds a plurality of blue laser diodes 71 which are semiconductor light emitting elements which are disposed so that their optical axes become parallel to the right side panel 14 and the left side panel 15. The heat sink 81 is a heat dissipating device on which the holder 72 is provided. In this embodiment, as will be described later, a total of eight blue laser diodes 71 arranged into an array of two rows and four columns is provided in the holder 72 so as to make up the first light source.

A lens array 73 including a plurality of collimator lenses is disposed in such a way that the collimator lenses are placed individually on optical axes of the corresponding blue laser diodes 71 to convert light from each of the blue laser diodes 71 into parallel light so as to enhance the directivity of light from each of the blue laser diodes 71.

The red light source device 120 is provided on a right-hand side of the excitation light shining device 70 so that the red light source device 120 and the excitation light shining device 170 are placed side by side. In this arrangement, an axis of light in the red wavelength range which is emitted from the red light source device 120 intersects an axis of light in the blue wavelength range which is emitted from the excitation light shining device 70 and is then reflected by a first reflection mirror 141 and an axis of light in the green wavelength range which is emitted from a luminescent plate 101. The red light source device 120 includes a red light source 121 which is disposed so that an optical axis thereof becomes parallel to the optical axes of the blue laser diodes 71 and a collective lens group 125 which collects light emitted from the red light source 121. This red light source 121 is a red light emitting diode which is a semiconductor light emitting element which emits light in the red light wavelength range.

The red light source device 120 includes a heat sink 130 which is disposed on a side of the red light source 121 which faces the front panel 12. On the other hand, a cooling fan 261 is disposed on a left-hand side of the excitation light shining device 70. Cooling air from the cooling fan 261 is sent to the heat sink 81 of the excitation light shining device 70 and the heat sink 130 of the red light source device 120, whereby the blue laser diodes 71 and the red light source 121 are cooled by the corresponding heat sinks 81, 130, respectively.

The luminescent plate device 100 which makes up the green light source device 80 is disposed on an optical path of excitation light which is emitted from the excitation light shining device 70 and is then reflected by the first reflection mirror 141 and near the right side panel 14. The luminescent plate device 100 includes the luminescent plate 101, a motor 110 which drives rotationally the luminescent plate 101, a collective lens group 111 and a collective lens 115. The luminescent plate 101 is a luminescent wheel and is disposed so as to be parallel to the right side panel 14, that is, so as to be parallel to an axis of light emitted from the excitation light shining device 70. The collective lens group 111 collects a pencil of excitation light which is emitted from the excitation light shining device 70 and is then reflected by the first reflection mirror 141 to the luminescent plate 101 and also collects a pencil of light which is emitted from the luminescent plate 101 in the direction of the left side panel 15. The collective lens 115 collects a pencil of light which is transmitted or transmitted diffusely through the luminescent plate 101 to be emitted in the direction of the right side panel 14. A cooling fan 262 is disposed on a side of the motor 110 which faces the right side panel 14, and the luminescent plate device 100 is cooled by this cooling fan 262.

A luminous light emitting area and an area which transmits or transmits diffusely excitation light which is emitted from the excitation light shining device 70 are provided continuously in a circumferential direction. The luminous light emitting area receives light emitted from the excitation light shining device 70 via the collective lens group 111 as excitation light to emit luminous light in the green wavelength range.

A base material for the luminescent plate 101 is a metallic base material which is made of copper, aluminum or the like. An annular groove is formed on a front surface of the base material which faces the excitation light shining device 70, and a bottom portion of this groove is mirror finished through silver deposition or the like, whereby a layer of a green luminescent material is laid on the mirror finished front surface. Further, in relation to the area where excitation light is transmitted or diffusely transmitted, in the event that the area is made into an excitation light transmitting area, a transparent base material having transmissivity is fitted in a light transmitting portion which is formed by cutting out part of the base material. On the contrary, in the event that the area is made into an excitation light diffuse transmission area, a base material whose surface is sandblasted to form minute irregularities on it is fitted in the cutout light transmitting portion.

In the luminescent material layer of the luminescent plate 101, when light in the blue wavelength range which is excitation light is shone on to the green luminescent material layer on the luminescent plate 101 from the excitation light shining device 70, the green luminescent material in the green luminescent material layer is excited, whereby light in the green wavelength range is emitted from the green luminescent material in every direction. A pencil of luminous light emitted in a luminescent fashion is emitted towards the left side panel 15 to enter the collective lens group 111. On the other hand, light in the blue wavelength range from the excitation light shining device 70 which is incident on the area on the luminescent plate 101 which transmits or diffusely transmits incident light is transmitted or diffusely transmitted through the luminescent plate 101 to enter the collective lens 115 which is disposed on a back surface side (in other words, a side facing the right side panel 14) of the luminescent plate 101.

The light guiding optical system 140 includes collective lenses which collect pencils of light in the red, green and blue wavelength ranges, as well as reflection mirrors, dichroic mirrors and the like which change the directions of axes of the pencils of light in the red, green and blue wavelength ranges so that the directions of the axes are aligned in the same direction. Specifically speaking, the light guiding optical system 140 includes the first reflection mirror 141, a collective lens 151, a diffuse plate 152, a first dichroic mirror 142, a second reflection mirror 143, a collective lens 146, a third reflection mirror 149, a collective lens 147, a collective lens 145, and a second dichroic mirror 148.

The first reflection mirror 141 is disposed on a side of the excitation light shining device 70 which faces the back panel 13. This first reflection mirror 141 changes the direction of an axis of light in the blue wavelength range, which is emitted from the excitation light shining device 70, through 90 degrees in the direction of the right side panel 14.

The collective lens 151 is disposed on a side of the first reflection mirror 141 which faces the right side panel 14. The diffuse plate 152 is disposed on a side of the collective lens 151 which faces the right side panel 14. Excitation light which is reflected by the first reflection mirror 141 is collected by the collective lens 151 and is then diffused by the diffuse plate 152.

The first dichroic mirror 142 is disposed in a position where light in the blue wavelength range which is diffusely transmitted through the diffuse plate 152 and light in the green wavelength range which is emitted from the luminescent plate 101 intersect light in the red wavelength range which is emitted from the red light source device 120. This first dichroic mirror 142 transmits light in the blue and red wavelength ranges and reflects light in the green wavelength range so that the direction of an axis of the light in the green wavelength range is changed through 90 degrees in the direction of the back panel 13.

The second reflection mirror 143 is disposed on the axis of the light in the blue wavelength range which is transmitted or diffusely transmitted through the luminescent plate 101, that is, between the collective lens 115 and the right side panel 14. This second reflection mirror 143 reflects the light in the blue wavelength range to change the direction of the axis of the blue light through 90 degrees in the direction of the back panel 13. The collective lens 146 is disposed on a side of the second reflection mirror 143 which faces the back panel 13, and the third reflection mirror 149 is disposed on a side of the collective lens 146 which faces the back panel 13. The collective lens 147 is disposed on a side of the third reflection mirror 149 which faces the left side panel 15. The third reflection mirror 149 changes the direction of the axis of the light in the blue wavelength range, which is reflected by the second reflection mirror 143 and is then incident thereon through the collective lens 146, through 90 degrees in the direction of the left side panel 15.

The collective lens 145 is disposed on aside of the first dichroic mirror 142 which faces the back panel 13. Further, the second dichroic mirror 148 is disposed on a side of the collective lens 145 which faces the pack panel 13 and on a side of the collective lens 147 which faces the left side panel 15. The second dichroic mirror 148 reflects light in the red wavelength range and light in the green wavelength range so that the directions of axes of the red light and the green light are changed through 90 degrees in the direction of the left side panel 15 and transmits the light in the blue wavelength range incident thereon through the collective lens 147.

The axis of the light in the red wavelength range which is transmitted through the first dichroic mirror 142 and the axis of the light in the green wavelength range which is reflected by the first dichroic mirror 142 so that the axis thereof coincides with the axis of the light in the red wavelength range enter the collective lens 145. Then, the light in the red and green wavelength ranges which is transmitted through the collective lens 145 is reflected by the second dichroic mirror 148 and is then collected to the entrance port of the light tunnel 175 through a collective lens 173 of the light source side optical system 170. On the other hand, the light in the blue wavelength range which is transmitted through the collective lens 147 is then transmitted through the second dichroic mirror 148 to be collected to the entrance port of the light tunnel 175 through the collective lens 173.

The light source side optical system 170 includes the collective lens 173, the light tunnel 175, a collective lens 178, a collective lens 170, a light shining mirror 185, and a condenser lens 195. The condenser lens 195 emits image light which is emitted from the display device 51, which is disposed on a side of the condenser lens 195 which faces the back panel 13, towards a fixed lens group 225 and the movable lens group 235, and therefore, the condenser lens 195 is also regarded as a part of the projection side optical system 220.

The collective lens 173 is disposed between the light tunnel 175 and the second dichroic mirror 148, and this collective lens 173 collects the light from the light sources to the entrance port of the light tunnel 175. Consequently, the light in the red wavelength range, the light in the green wavelength range and the light in the blue wavelength range are collected by the collective lens 173 to be incident on the light tunnel 175. The red, green and blue light beams which enter the light tunnel 175 are formed into beams of such light where the intensity of light is uniformly distributed across the width of the beam as they travel down the light tunnel 175.

The collective lenses 178, 179 are disposed on an optical axis of the light tunnel 175 at an end thereof which faces the left side panel 15. The beam or pencil of red, green or blue light emitted from the light tunnel 175 is shone on to the light shining mirror 185 through the collective lenses 178, 179 and is then shone on to the display device 51 at a predetermined angle through the condenser lens 195 by the light shining mirror 185. A heat sink 190 is provided on a side of the display device 51, which is made up of DMDs, which faces the back panel 13, and the display device 51 is cooled by this heat sink 190.

The pencils of red, green and blue light from the respective light sources are shone on to an image forming surface of the display device 51 by the light source side optical system 170 and are then reflected on the image forming surface of the display device 51 to be projected on to a screen as projected light through the projection side optical system 220. Here, the projection side optical system 220 includes the condenser lens 195, the movable lens group 235 and the fixed lens group 225. The movable lens group 235 is made movable by a lens motor. Then, the movable lens group 235 and the fixed lens group 225 are incorporated in a fixed lens barrel. Consequently, the fixed lens barrel including the movable lens group 235 is formed into a focus-variable lens where zooming and focusing controls are available.

By configuring the projector 10 in the way described heretofore, when the luminescent plate 101 is rotated with blue light and red light emitted from the excitation light shining device 70 and the red light source device 120, respectively, at different timings, light in the red wavelength range, light in the green wavelength range and light in the blue wavelength range are caused to enter the collective lens 173 and the light tunnel 175 through the light guiding optical system 140 sequentially and are then caused to enter the display device 51 through the light source side optical system 170. Thus, the DMDs which is the display device 51 of the projector 10 display the light beams of the corresponding colors in a time-sharing fashion according to the data, whereby a color image can be projected on to the screen.

Figure 4:
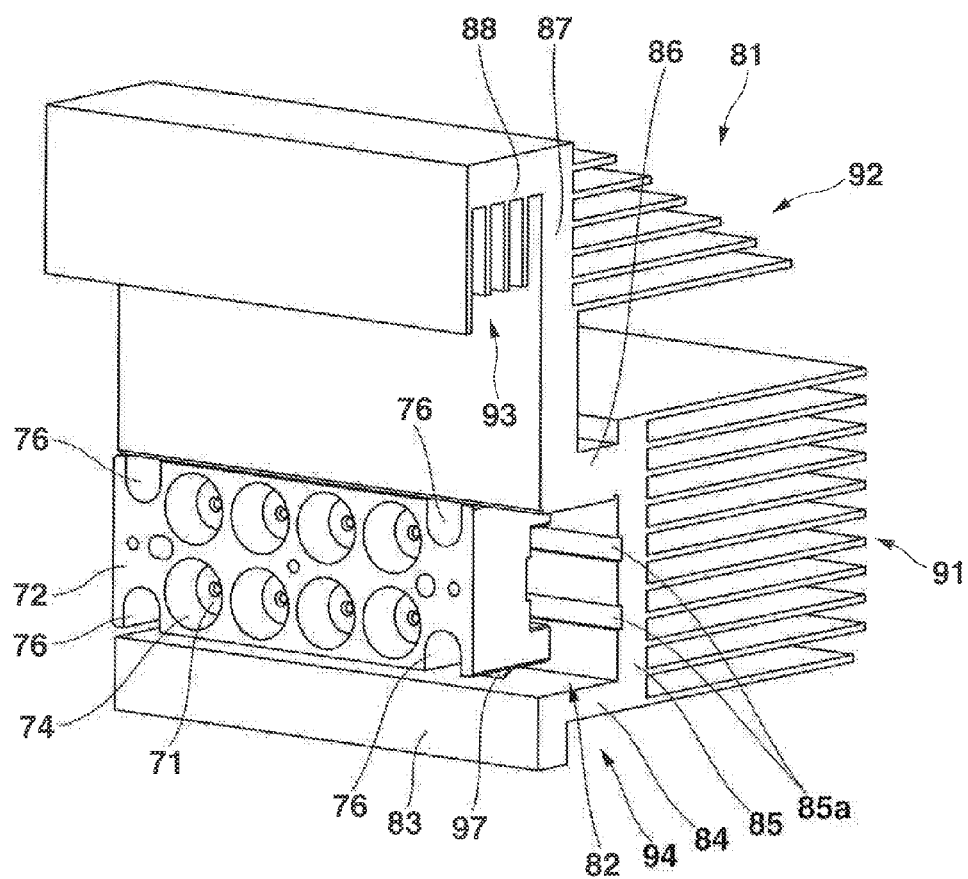
FIG. 4 is a perspective view showing a heat sink according to the first embodiment of the invention.
Figures 5A, 5B:
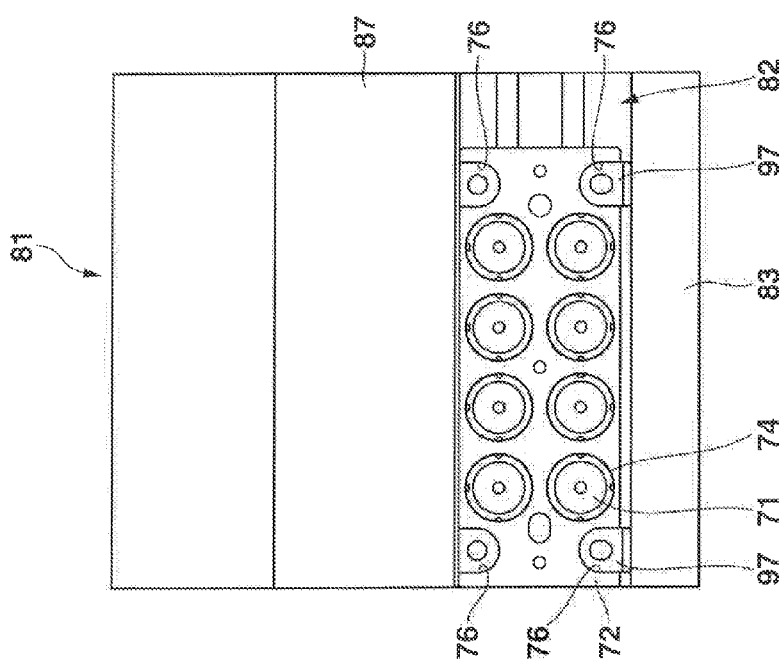
FIG. 5A is a front view of the heat sink according to the first embodiment of the invention.
FIG. 5B is a side view of the heat sink according to the first embodiment of the invention.
Figure 7:
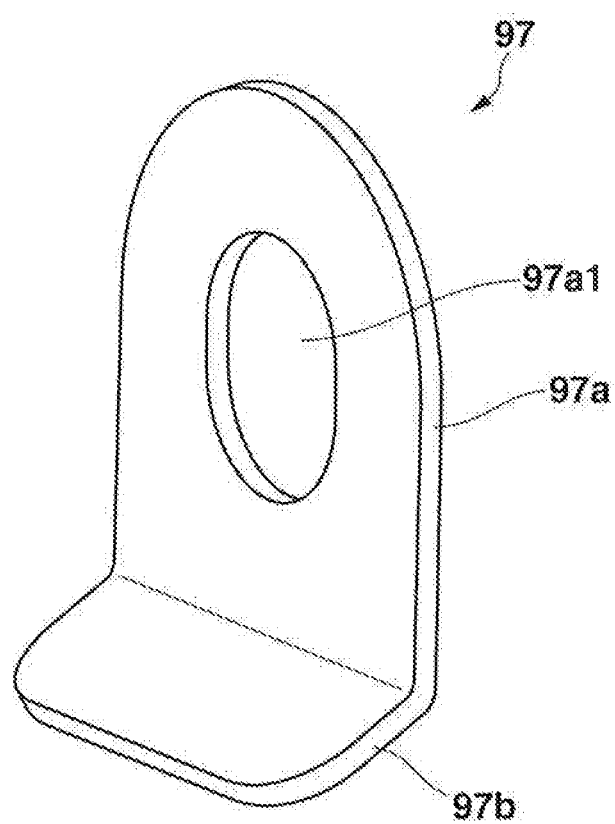
FIG. 7 is a perspective view showing a biasing member according to the first embodiment of the invention.

Next, referring to FIGS. 4 to 7, the heat sink 81 which makes up the heat dissipating device for the excitation light shining device 70 and the holder 72 will be described. FIG. 4 is a perspective view of the heat sink 81 with the holder 72. FIG. 5A is a front view of the heat sink 81, and FIG. 5B is a side view of the heat sink 81. FIGS. 6A, 6B show modified examples made to the heat sink 81. FIG. 7 is a perspective view showing a plate spring 97 which is a biasing member for biasing the holder 72. The blue laser diodes 71 which are held in the holder 72 emit laser beams to the left in FIG. 5B. The first light source is formed by holding the blue laser diodes 71 which are the semiconductor light emitting elements to the holder 72.

The heat sink 81 is disposed with the emitting directions of the blue laser diodes 71 oriented towards the back panel 13 and an upper side thereof shown in FIG. 4 oriented towards the upper panel 11. However, in the following description, the construction of the heat sink 81 will be described with the emitting directions of the laser diodes 71 being referred to as front and opposite directions to the emitting directions of the blue laser diodes 71 being referred to as rear.

The holder 72 provided on the heat sink 81 has a substantially block-shaped external appearance. The holder 72 is fabricated into a die-cast aluminum holder. A total of eight holding holes 74 is formed in the holder 72, and these holding holes 74 are arranged into an array of two rows and four columns. One blue laser diode 71 is held in one holding hole 74. In this way, the total of eight blue laser diodes 71 arranged into the array of two rows and four columns are provided in the holder 72 in this embodiment.

As shown in FIGS. 4 and 5B, the heat sink 81 is formed by combining together a number of flattened plates. The heat sink 81 is formed by extruding an aluminum alloy, and hence, these flattened plates are formed identical in relation to a lateral width dimension in a left-to-right direction in FIG. 5A. A main heat dissipating portion of the heat sink 81 is formed by a fixing portion 82 and a first heat dissipating portion 91. The fixing portion 82 is formed into a recess portion having a U-shape when seen from a side thereof as shown in the side view in FIG. 5B, and the holder 72 is accommodated in the fixing portion 82. An auxiliary heat dissipating portion is formed by a second vertical plate 87 which is erected from the fixing portion 82 and a second heat dissipating portion 92. Consequently, the auxiliary heat dissipating portion is provided above the main heat dissipating portion.

A base vertical plate 83 is formed at a lower end of the heat sink 81. A base horizontal plate 84 is formed which extends from an upper end of the base vertical plate 83 to the rear. A first vertical plate 85 is formed so as to be erected upwards from a rear end of the base horizontal plate 84. A horizontal plate 86 is formed so as to extend from a position on the first vertical plate 85 which lies slightly below an upper end of the first vertical plate 85 to the front. A second vertical plate 87 is provided so as to be erected upwards from a front end of the horizontal plate 86, and the second vertical plate 87 is made into a flat plate portion. An air blowing horizontal plate 88 is formed so as to extend from an upper end of the second vertical plate 87 to the front.

A plurality of heat dissipating fins which are thin horizontal plates are provided on an opposite surface of the first vertical plate 85 of the main heat dissipating portion to a side surface thereof where the fixing portion 82 is formed so as to extend therefrom to the rear, whereby the first heat dissipating portion 91 is formed. Similarly, a plurality of heat dissipating fins which are thin horizontal plates are provided on a back surface of the second vertical plate 87 of the auxiliary heat dissipating portion so as to extend therefrom to the rear, whereby the second heat dissipating portion 92 is formed. A thin plate which constitutes a lowermost heat dissipating fin of the first heat dissipating portion 91 is formed slightly shorter in length in a front-to-rear direction than the other thin plates which are the other heat dissipating fins of the first heat dissipating portion 91, as shown in FIG. 5B. In addition, the thin plates which constitute heat dissipating fins of the second heat dissipating portion 92 are formed so that their lengths in the front-to-rear direction become gradually longer from an upper side to a lower side, as shown in FIG. 5B. Further, a number of thin plates which constitute vertical heat dissipating fins are provided on a lower surface of the air blowing horizontal plate 88 so as to extend downwards therefrom, whereby a third heat dissipating portion 93 is formed.

As shown in FIGS. 4 and 5B, a front foremost thin plate of the third heat dissipating portion 93 is formed longer in an up-to-down direction than the other thin plates of the third heat dissipating portion 93. A duct portion having a U-shaped vertical section is defined by the front foremost thin plate of the third heat dissipating portion 93, the air blowing horizontal plate 88 and the second vertical plate 87. The duct portion is opened downwards. Although this will be described later, cooling air is caused to flow along this duct portion.

As a side view of a first modified example made to the heat sink 81 is shown in FIG. 6A, a construction can be adopted in which only a duct portion having a U-shaped vertical section is formed in front of the second vertical plate 87 of the heat sink 81, with no fin being provided in the duct portion and the duct portion is configured so as to cause cooling air from the cooling fan 261 to flow in the direction of the red light source device 120.

Further, as a side view of a second modified example made to the heat sink 81 is shown in FIG. 6B, a construction can be adopted in which a duct portion having a U-shaped vertical section is formed in front of the second vertical plate 87 of the heat sink 8, the duct portion being made up of the second vertical plate 87, the air blowing horizontal plate 88 and an air blowing vertical plate 89 which is suspended perpendicularly from the air blowing horizontal plate 88 and the duct portion being configured to cause cooling air from the cooling fan 261 to flow in the direction of the red light source device 120. Then, a plurality of fins 95, which are parallel to the plurality of fins of the second heat dissipating portion 92, may be configured so as to be provided on a surface of the air blowing vertical plate 89 which faces the second vertical plate 87 to control the cooling air flowing in the duct portion.

In the heat sink 81, a hook portion 94 is formed by the base vertical plate 83 and the base horizontal plate 84. In disposing the heat sink 81 in the projector 10, the heat sink 81 can easily be positioned by this hook portion 94. Then, the fixing portion 82 having the U-shaped vertical section is formed by the base horizontal plate 84, the first vertical plate 85 and the horizontal plate 86. The holder 72 is provided in the fixing portion 82. Tow upper and lower grooves 85a are formed on a front surface of the first vertical plate 85 so as to extend laterally across the front surface. As shown in FIG. 5B, FPCs, not shown, are fitted individually in the grooves 85a so as to be connected to lead terminals 71a projecting from the blue laser diodes 71.

On the other hand, attaching holes 76 are provided near four corners of the holder 72 as shown in FIG. 4. When seen from the front, the attaching holes 76 are respectively formed into a semi-elongated hole shape formed by connecting a semi-circular portion and a straight-line portion. The attaching holes 76 are semi-elongated holes with a countersunk portion when seen from the front. Then, a circular through hole, when seen from the front, is opened to extend to the rear from the countersunk portion.

The plate spring 97 shown in FIG. 7 is inserted into each of the two lower attaching holes 76 of the holder 72. The plate spring 97 is formed as a metallic plate part. The plate spring 97 is made up of a vertical plate 97a and an inclined plate 97b which extends from a lower end of the vertical plate 97a to the front while being inclined downwards. A screw hole 97a1, which is slightly longer in the up-to-down direction, is formed substantially at a center of the vertical plate 97a.

The plate springs 97 are inserted individually into the two lower attaching holes 76 of the holder 72 for attachment to the holder 72. As this occurs, aback surface of the vertical plate 97a of each of the plate springs 97 is brought into abutment with the semi-elongated countersunk portion of the corresponding attaching hole 76. Then, the holder 72 is biased towards an upper connecting surface by means of the elastic force of a bent portion of each of the plate springs 97 where the vertical plate 97a is connected to the inclined plate 97b. After the plate springs 97 are attached to the holder 72, screws are inserted into the four mounting holes 76 formed near the four corners of the holder 72, whereby the holder 72 and the heat sing 81 are fixed together.

Then, the holder 72 is connected to the front surface of the first vertical plate 85, which constitutes a first connecting surface, on a rear surface side thereof and is then fixed thereto. The holder 72 is biased upwards by the plate springs 97, and therefore, an upper surface of the holder 72, which is one of side surfaces of the holder 72, is disposed so as to be brought into close contact with a lower surface of the horizontal plate 86. Namely, the lower surface of the horizontal plate 86 which is provided to continue to the vicinity of the end portion of the second vertical plate 87 constitutes a second connecting surface. In other words, the second vertical plate 87 is provided near an end portion of the second connecting surface.

The holder 72 is provided in the heat sink 81 in the way described above, whereby even though the plurality of blue laser diodes 71 are driven to generate heat, the heat generated is conducted to the first vertical plate 85 through the rear surface of the holder 72 to be dissipated from the first heat dissipating portion 91. Further, the heat from the plurality of blue laser diodes 71 is conducted to the horizontal plate 86 through the upper surface of the holder 72 and is then conducted to the second vertical plate 87 to thereby be dissipated from the second heat dissipating portion 92. Furthermore, in the heat conducted to the second vertical plate 87, the heat which cannot be dissipated by the second heat dissipating portion 92 is conducted to the third heat dissipating portion 93 through the air blowing horizontal plate 88 to thereby be dissipated by the third heat dissipating portion 93.

Depending upon the heat dissipating capacities of the first heat dissipating portion 91, the second heat dissipating portion 92 and the third heat dissipating portion 93, the heat dissipating capacities can be made available mutually. In the event that the heat dissipating capacities of the first heat dissipating portion 91 and the second heat dissipating portion 92 are sufficient, the third heat dissipating portion 93 can be omitted.

The heat sink 81 is disposed in the projector 10 in a position shown in FIG. 3 as part of the excitation light shining device 70. The second light source device 120 is the second light source which emits light in the red wavelength range which is different from light in the blue wavelength range emitted from the excitation light shining device 70 which includes the first light source and is provided side by side with the excitation light shining device 70. The cooling fan 261 for blowing a cooling air is disposed on an opposite side to a side of the excitation light shining device 70 which is a side where the red light source device 120 is provided. Consequently, the red light source device 120 is disposed downstream of the excitation light shining device 70 in relation to the air flowing direction.

In this configuration, when cooling air is blown from the cooling fan 261, this cooling air is caused to flow along the duct portion having the U-shaped vertical section which is formed at the upper portion of the heat sink 81, as shown in FIGS. 4 and 5B. Then, the cooling air is blown down appropriately to the heat sink 130 of the red light source device 120 which is provided side by side and downstream of the excitation light shining device 70 shown in FIG. 3.

In place of or in addition to the cooling fan 261 described above, a cooling fan configured to discharge air inside the housing to the outside thereof can be provided on the side of the red light source device 120 which faces the right side panel 14. In this case, too, the cooling air flows from the excitation light shining device 70 towards the red light source device 120.

Figure 8:
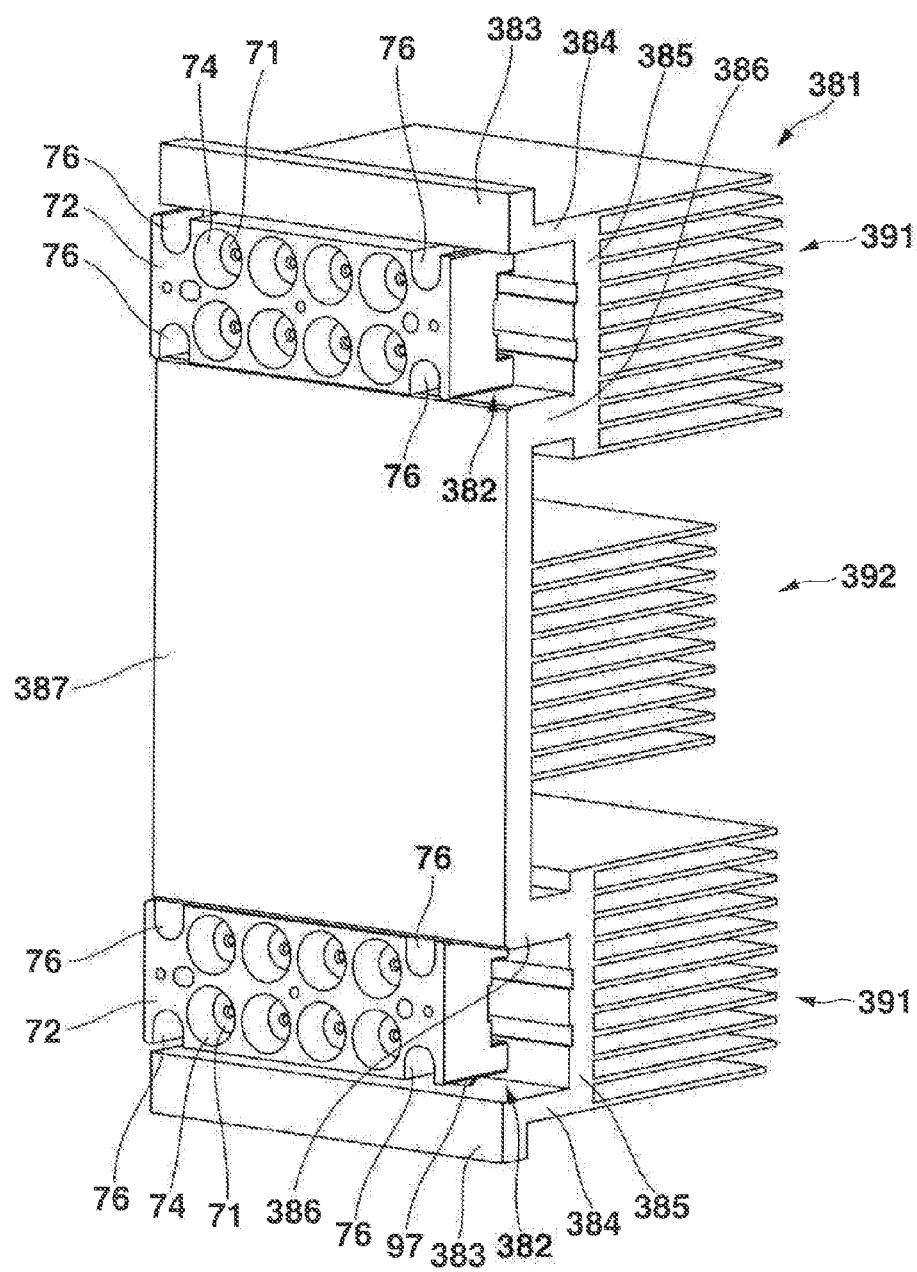
FIG. 8 is a perspective view showing a heat sink according to a second embodiment of the invention.
Figure 9B:
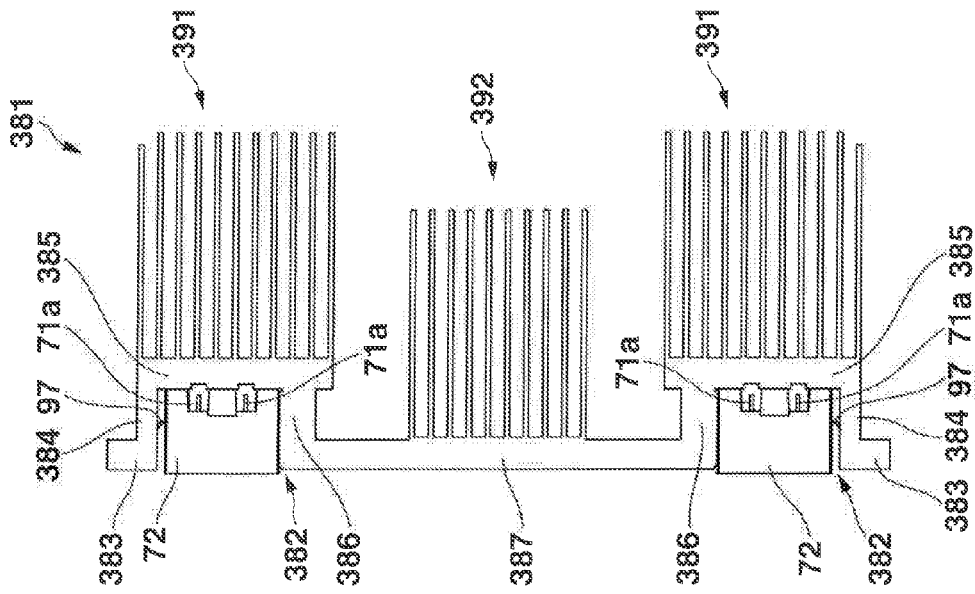
FIG. 9B is a side view of the heat sink according to the second embodiment of the invention.
Figure 9A:
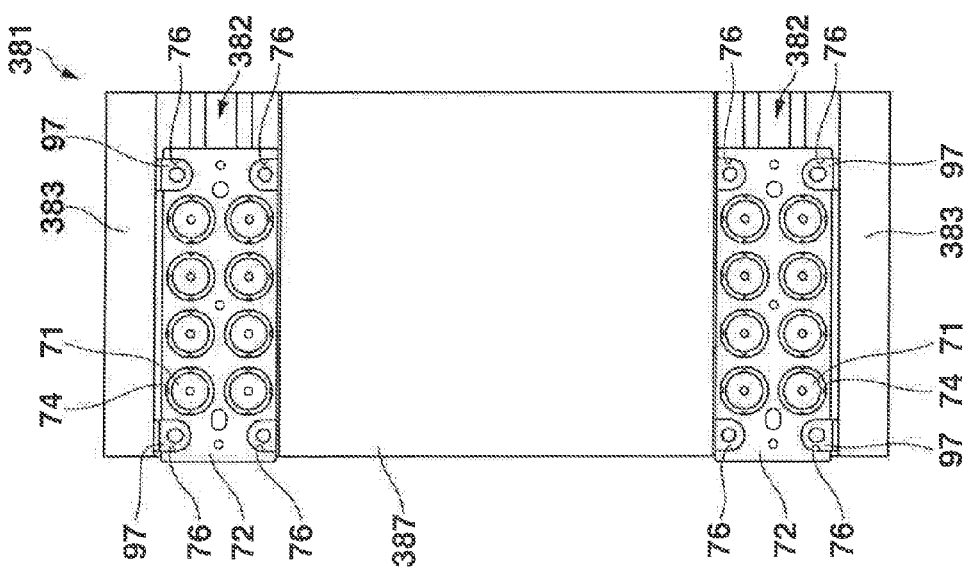
FIG. 9A is a front view of the heat sink according to the second embodiment of the invention.

Nest, a head dissipating device according to a second embodiment will be described based on FIGS. 8, 9A and 9B. FIG. 8 is a perspective view of a heat sink 381 which is a heat dissipating device, FIG. 9A is a front view of the heat sink 381, and FIG. 9B is a side view of the heat sink 381. Two upper and lower holders 72 have the same configuration as that of the holder 72 in the first embodiment, and hence, like reference numerals will be given to like portions and members to those of the first embodiment to omit or simplify the description thereof.

In the heat sink 381 of this embodiment, an auxiliary heat dissipating portion is provided to expand between main heat dissipating portions which are provided so as to be spaced apart from each other in an up-to-down direction. Namely, similar to the first embodiment, the main heat dissipating portions are each formed by a fixing portion 382 and a first heat dissipating portion 391. The fixing portion 382 includes a base horizontal plate 384, a first vertical plate 385 and a horizontal plate 386. A number of thin plates extend from a back surface of the first vertical plate 385 to the rear, whereby the first heat dissipating portion 391 is formed.

Base vertical plates 383 which are connected to front ends of the base horizontal plates 384 of the upper main heat dissipating portion and the lower main heat dissipating portion are formed symmetrical with each other in the up-to-down direction.

On the other hand, the auxiliary heat dissipating portion includes a second vertical plate 387 which is formed as a flat plate portion and a second heat dissipating portion 392 which is formed by thin plates which extend from a back surface of the second vertical plate 387 to the rear. The horizontal plates 386 of the upper and lower main heat dissipating portions are connected to each other by the second vertical plate 387.

In this embodiment, too, the heat sink 381 is formed by extruding an aluminum alloy. In addition, similar to the first embodiment described above, the heat sink 381 is disposed in the same position as the position where the heat sink 81 is disposed as shown in FIG. 3.

The upper and lower holders 72 are fixed to the heat sink 381 by inserting screws into attaching holes 76 which are provided at four locations of each of the holders 72. As this occurs, back surfaces of the upper and lower holders 72 are connected to front surfaces of the upper and lower first vertical plate portions 385 which constitute upper and lower first connecting surfaces, respectively.

The two holders 72 which are held to the heat sink 381 are biased individually by plate springs 97. The lower holder 72 is biased upwards by the plate springs 97 being inserted into two lower attaching holes 76 of the lower holder 72. Consequently, an upper surface of the lower holder 72 is brought into close contact with a lower surface of the lower horizontal plate 386. In this way, in the lower main heat dissipating portion, the lower surface of the lower horizontal plate 386 which is provided to continue to the second vertical plate 387 constitutes a second connecting surface.

On the other hand, the upper holder 72 is biased downwards by the plate springs 97 being inserted into two upper attaching holes 76 of the upper holder 72. Consequently, a lower surface of the upper holder 72 is brought into close contact with an upper surface of the upper horizontal plate 386. In this way, in the upper main heat dissipating portion, the upper surface of the horizontal plate 386 which is provided to continue to the second vertical plate 387 constitutes a second connecting surface.

In this way, in the upper and lower holders 72, the one side surface and the back surface of each holder 72 is connected to the heat sink 381. Consequently, even though blue laser diodes 71 which are held in the holders 72 are driven to generate heat, the heat generated is conducted from the back surfaces of the holders 72 to the first vertical plates 385 and is then dissipated from the first heat dissipating portions 391. The heat is also conducted from the specific side surfaces of the holders 72 to the horizontal plates 386 and the second vertical plate 387 and is then dissipated from the second heat dissipating portion 392.

In this embodiment, the blue laser diodes 71 are disposed in each of the two fixing portions 382 of the heat sink 381. However, the invention is not limited thereto, and hence, light sources which emit light in the different wavelength ranges can also be provided in the fixing portions 382. For example, a configuration may be adopted in which a red light source device is provided in the upper fixing portion 382, while a blue light source device is provided in the lower fixing portion 382.

A duct portion having a U-shaped vertical section through which cooling air flows from a cooling fan 261 can also be formed at an end portion of the upper base vertical plate 383 or on a front surface of the second vertical plate 387 of the heat sink 381. Further, a third heat dissipating portion can also be provided on the duct portion.

Thus, while the embodiments of the invention have been described heretofore, the invention is not limited by the embodiments but can be carried out in various forms. For example, the holder 72 or holders 72 are described as being formed so as to be connected to the second connecting surface or surfaces of the heat sink 81 or 381 at the one side surface thereof. However, a configuration may be adopted in which a plurality of second connecting surfaces are formed for the holder 72 so that the holder 72 is connected to the plurality of second connecting surfaces at a plurality of side surfaces thereof. For example, in the heat sink 81, the upper surface of the holder 71 is described as being connected to the lower surface of the horizontal flat plate 86 which constitutes the second connecting surface. However, in addition to this form of connection, a form may be adopted in which left and right side surfaces or a lower surface of the holder 72 is connected to the heat sink 81.

Thus, as has been described heretofore, the heat sink 81, 381 which constitutes the heat dissipating device includes the fixing portion 82, 382 which fixes in place the first light source which is the holder 72 which holds the blue laser diodes 71 and the first heat dissipating portion 91, 391. Then, the second vertical plate 87, 387 which constitutes the flat plate portion is erected from the fixing portion 82, 382. The second heat dissipating portion having the plurality of heat dissipating fins is provided on the second vertical plate 87, 387. This can increase the heat dissipating capacity of the heat dissipating device, and therefore, it is possible to provide the heat dissipating device which can include the highly bright light source and which can be made small in size.

The fixing portion 82, 382 includes the first connecting surface which is the front surface of the first vertical plate 85, 385 and the second connecting surface which is the lower surface of the horizontal plate 86 and the upper or lower surface of the horizontal plate 386. The first connecting surface is connected to the back surface of the first light source which includes the holder 72, and the second connecting surface is connected to the side surface of the first light source.

By adopting this configuration, not only the back surface but also the side surface of the holder 72 which has the block-like shape can be connected to the heat sink 81, 381, and the heat dissipating capacity of the heat dissipating device can be increased. Thus, this enables the fabrication of the head dissipating device while obviating the necessity of providing other cooling devices such as a heat pipe.

The second vertical plate 87, 387 which constitutes the flat plate portion is provided near the end portion of the second connecting surface. By adopting this configuration, the second connecting surface and the second vertical plate 87, 387 which constitutes the flat plate portion having the second heat dissipating portion 92 can be formed within a short distance. Consequently, the distance between the holder 72 and the second heat dissipating portion 92 can be shortened, and therefore, the heat dissipating efficiency from the side surface of the holder 72 can be increased.

The holder 72 of the first light source is biased towards the upper surface of the horizontal plate 86 or the upper surface or the lower surface of the horizontal plate 386 which constitutes the second connecting surface by the plate springs 97 which constitute the biasing members. By adopting this configuration, the side surface of the holder 72 and the upper surface of the horizontal plate 86 or the upper surface or the lower surface of the horizontal plate 386 are brought into close contact with each other, and therefore, heat can be conducted in a more ensured fashion.

The auxiliary heat dissipating portion having the second heat dissipating portion 92 is provided above the main heat dissipating portion to which the holder 72 is fixed. By adopting this configuration, since heat is conducted while rising upwards, the heat of the holder 72 can be dissipated more efficiently.

The two upper and lower first heat dissipating portions are provided at the two locations which are spaced apart from each other, and the second vertical plate 387 which constitutes the flat plate portion of the second heat dissipating portion is provided to extend between the upper and lower first heat dissipating portions. By adopting this configuration, the heat dissipation can be executed appropriately while stacking the two light sources in the heat sink 381.

The duct portion having the U-shaped vertical section and having the opening portion which is oriented downwards is provided on the heat sink 81. By adopting this configuration, a part of cooling air blown towards the heat sink 81 can be sent to the other devices needing to be cooled along the duct portion.

The third heat dissipating portion 93 is provided on the duct portion. This enables the efficient heat dissipation to be executed by making use of the cooling air which flows through the duct portion, and therefore, the heat dissipating capacity of the heat sink 81 can be increased more.

The block-shaped holder 72 which holds the plurality of blue laser diodes 71 of semiconductor light emitting elements which constitute the first light source is provided on the heat sink 81, 381. Then, the excitation light shining device 70 is configured so that the first light source including the heat sink 81, 381 which is the heat dissipating device is provided therein. By adopting this configuration, it is possible to provide the compact and highly bright light source unit 60.

The excitation light shining device 70 which includes the first light source and the red light source device 120 which constitutes the second light source are provided side by side. By adopting this configuration, only the single cooling fan can be disposed at the one location for the light source devices of the different colors which need to be cooled. Thus, the respective heat sinks 81, 381 for the two light source devices can be cooled efficiently by the cooling fan 261 provided at the one location.

The luminescent plate device 100 is provided which emits light in the green wavelength range by using light emitted from the excitation light shining device 70 including the first light source as excitation light. The luminescent plate device 100 includes the luminous light emitting area and the light transmitting area, and therefore, the excitation light from the excitation light shining device 70 can be used as the blue light source. By adopting this configuration, it is possible to provide the light source unit 60 which includes the light sources which emit light in the red, green and blue wavelength ranges and the heat sink 81, 381 whose heat dissipating capacity is increased.

The projector 10 is formed by the light source unit 60 described heretofore, the display device 51, the projection side optical system 220 and the projector control unit. By adopting this configuration, it is possible to provide the highly bright and compact projector 10.

The embodiments that have been described heretofore are presented as the examples of the invention, and there is no intention to limit the invention by them. These novel embodiments can be carried out in other various forms, and various omissions, replacements, alterations and/or modifications can be made thereto without departing from the spirit and scope of the invention. These embodiments and modifications made thereto are included in the spirit and scope of the invention and are also included in the scope of inventions claimed separately and equivalents thereof.

What is claimed is:

1. A heat dissipating device comprising:
a fixing portion which fixes a first light source;
a first heat dissipating portion which has a plurality of fins which are provided on a back surface side of the fixing portion;
a flat plate portion which is erected from the fixing portion; and
a second heat dissipating portion having a plurality of fins which are provided on the flat plate portion,
wherein the fixing portion has a first connecting surface which is connected to a back surface of the first light source and a second connecting surface which is connected to a side surface of the first light source.

2. The heat dissipating device according to claim 1, wherein the flat plate portion is provided near an end portion of the second connecting surface.

3. The heat dissipating device according to claim 1, wherein the first light source is biased towards the second connecting surface by a biasing member.

4. The heat dissipating device according to claim 1, wherein the second heat dissipating portion is formed on an upper side of the first heat dissipating portion.

5. A heat dissipating device comprising:
a fixing portion which fixes a first light source;
a first heat dissipating portion which has a plurality of fins which are provided on a back surface side of the fixing portion;
a flat plate portion which is erected from the fixing portion; and
a second heat dissipating portion having a plurality of fins which are provided on the flat plate portion,
wherein first heat dissipating portions are provided at two locations while being spaced apart from each other, and
wherein the flat plate portion on which the second heat dissipating portion is provided is provided so as to extend between the first heat dissipating portions which are located at the two locations.

6. The heat dissipating device according to claim 5, wherein the second heat dissipating portion is formed on an upper side of the first heat dissipating portion.

7. A heat dissipating device comprising:
a fixing portion which fixes a first light source;
a first heat dissipating portion which has a plurality of fins which are provided on a back surface side of the fixing portion;
a flat plate portion which is erected from the fixing portion; and
a second heat dissipating portion having a plurality of fins which are provided on the flat plate portion,
wherein the flat plate portion has a duct portion having a U-shaped vertical section.

8. The heat dissipating device according to claim 7, wherein the duct portion has a third heat dissipating portion which has a plurality of fins.

9. The heat dissipating portion according to claim 7, wherein the first light source has a plurality of semiconductor light emitting elements, and
   wherein a holder which holds the plurality of semiconductor light emitting elements is fixed to the fixing portion.

10. A light source unit comprising:
   the first light source including the heat dissipating device according to claim 9 which has the holder which holds the plurality of semiconductor light emitting elements.

11. The light source unit according to claim 10, wherein the first light source is provided side by side with a second light source which emits light in a wavelength range which is different from light emitted by the first light source.

12. The light source unit according to claim 11, comprising:
   a luminescent plate device having a luminous light emitting area which emits luminous light by using light emitted from the first light source as excitation light and a light transmitting area which transmits light emitted from the first light source,
   wherein the luminescent light emitting area emits light in a wavelength range which is different from light emitted from the first light source and light emitted from the second light source.

13. A projector comprising:
   the light source unit according to claim 10;
   a light source side optical system which guides light from the light source unit to a display device;
   a projection side optical system which projects an image emitted from the display device on to onto a screen; and
   a projector control unit which controls the light source unit and the display device.

* * * * *

UNITED STATES PATENT AND TRADEMARK OFFICE
CERTIFICATE OF CORRECTION

PATENT NO. : 9,753,360 B2  
APPLICATION NO. : 15/005447  
DATED : September 5, 2017  
INVENTOR(S) : Kiyohiko Inoue Page 1 of 1

It is certified that error appears in the above-identified patent and that said Letters Patent is hereby corrected as shown below:

In the Claims

Column 16, Line 48, after "is provided" delete "is provided".

Column 18, Line 13, after "device" delete "on to".

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*